March 2, 1954

B. F. RYAN 2,670,904

FILM REWINDING SYSTEM

Filed Jan. 27, 1951

INVENTOR.
BYRON F. RYAN,
BY
ATTORNEY

March 2, 1954
B. F. RYAN
2,670,904
FILM REWINDING SYSTEM
Filed Jan. 27, 1951
2 Sheets-Sheet 2
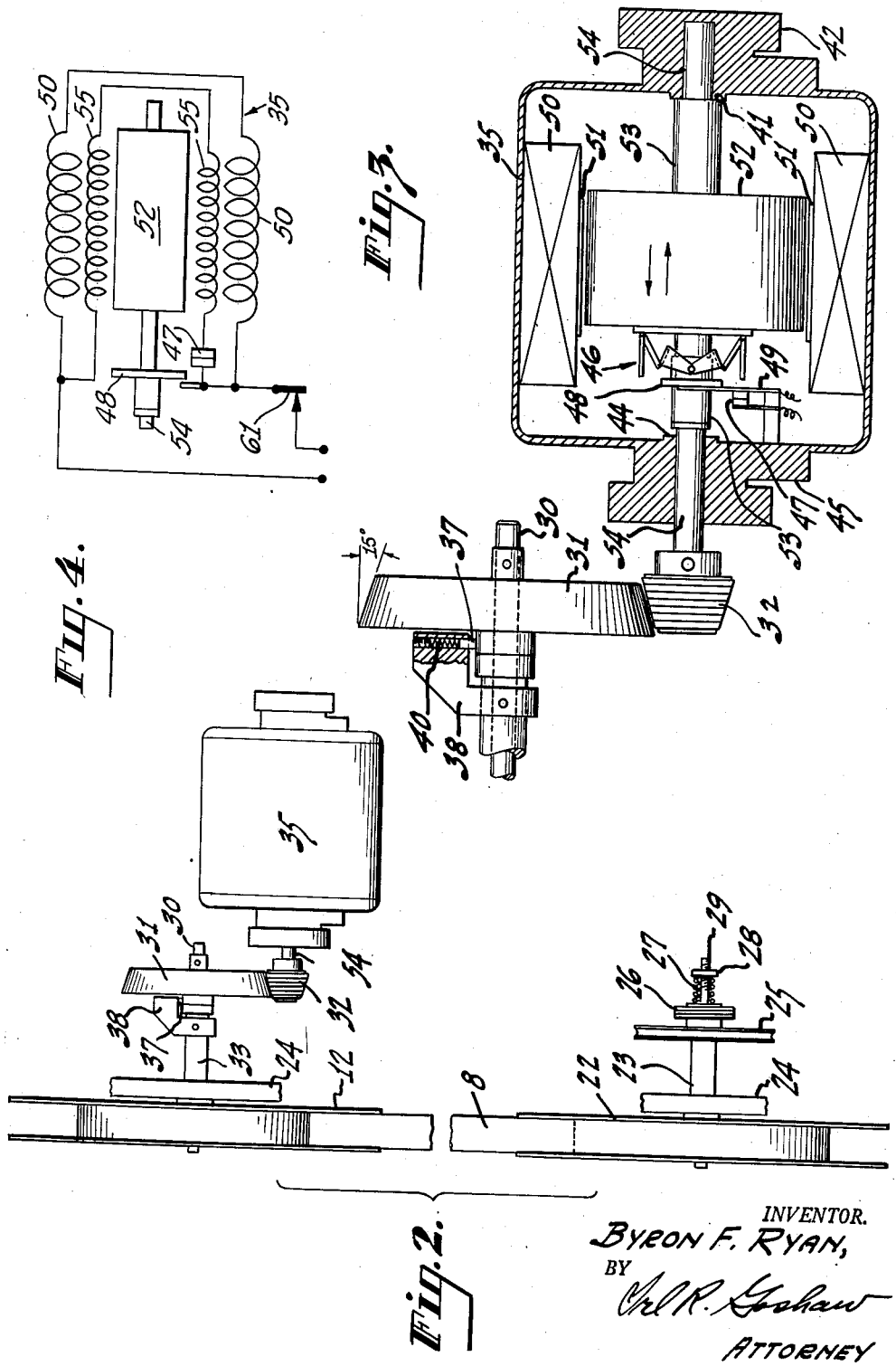
INVENTOR.
BYRON F. RYAN,
BY
ATTORNEY Patented Mar. 2, 1954

2,670,904

UNITED STATES PATENT OFFICE 2,670,904

FILM REWINDING SYSTEM

Byron F. Ryan, Van Nuys, Calif., assignor to Warner Bros. Pictures, Inc., Burbank, Calif., a corporation of Delaware Application January 27, 1951, Serial No. 208,131

5 Claims. (Cl. 242—55)

This invention relates to motion picture film apparatus, and particularly to a film rewind system for sound motion picture film reproducers.

In the production of motion pictures, the pictures are generally photographed on one film and the sound on one or more other films. That is, a second film may record the dialogue in a scene being photographed on the picture film, and later, background effects, such as crowd noises, hoof beats, storm effects, etc., may be combined with the dialogue sound track. This later operation is known as rerecording, and is one in which all the individual sound films are reproduced individually on separate sound reproducers and the sound currents combined through a mixing console and then recorded into a composite sound track. In performing the rerecording operation, there are generally several rehearsals before the final "take." Frequently, the reproducers are stopped during the rerecording of a sound sequence and the film rewound for repetition of the rehearsal or "take." Thus, several sound films must be returned to their starting points, or completely rewound.

To expedite the rewinding operation, a comparatively large motor is employed to rewind the film. A large motor accomplishes this operation quickly while overcoming the take-up clutch friction as well as the holdback friction on the supply reel. However, during the reproduction of the film, a large motor imposes a considerable drag on the film, and, in some instances where the film is weak or is subjected to unusual jerks, it may be actually broken. Even though no damage is done to the film, the high tension in the film may interfere with the smooth action and uniform motion of the film past the translation point. This is particularly true when the diameter of the supply roll of film becomes small.

The present invention is directed to a rewind system, whereby the desired large motor may be employed for rewinding the film at the speed desired, while, at the same time, automatically removing the motor from the supply reel during reproduction of the film to remove any undue tension therein. This is accomplished by providing axial movement of the rotor of the motor so that the motor is connected to the rewind reel only when energized and disconnected therefrom when de-energized.

The principal object of the invention, therefore, is to facilitate the rewinding of motion picture film.

Another object of the invention is to provide an improved rewind system for motion picture film.

A further object of the invention is to provide a rewind system for motion picture film which will rapidly rewind the film without introducing undue tension in the film as it is taken from the supply reel.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Fig. 2 is an elevational, front view of the essential elements of the invention.

Fig. 3 is a detailed cross-sectional view of the motor drive system for the rewind reel, and Fig. 4 is an electrical circuit diagram of the starting circuit for the rewind motor used in the invention.

Figure 1:
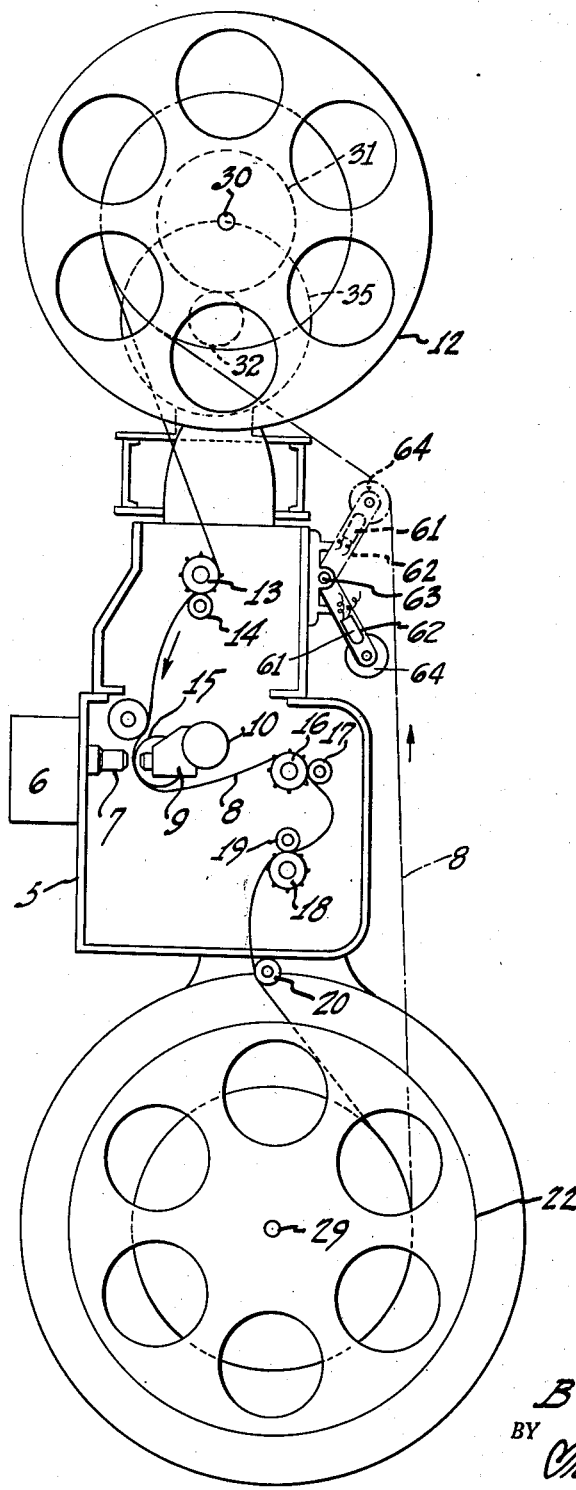
Fig. 1 is an elevational, side view of a film reproducer embodying the invention.

Referring now to the drawings, in which the same numerals identify like elements, a sound film reproducer includes a frame 5 and has a light source within a housing 6, the light being projected through an optical unit 7 to a film 8. The emergent light from the film passes through an optical unit 9 to a photoelectric cell 10. As shown by the solid line, the film 8 is supplied from a supply reel 12 and passes through the reproducer in the direction of the arrow around a sprocket 13 having a pad roller 14, around the sound drum 15, over a sprocket 16 with a pad roller 17, over a sprocket 18 with a pad roller 19, and around a roller 20 to a take-up reel 22.

The take-up reel 22 is mounted on and driven by a shaft 29 passing through a sleeve 23 on the frame 24, the shaft 29 being driven by a pulley 25 through a take-up clutch 26 biased by a coil spring 27 and a tension adjusting nut 28. That is, to compensate for increasing roll diameter of the film, the pulley drives one section of the clutch 26, the other section being attached to the shaft 29, as is well-known in the art.

The supply reel is mounted on a shaft 30 passing through the frame 24 and bushing 33, and on which is a pulley 31 having a beveled outside perimeter surface. The pulley 31 is driven by a tapered puck 32 made up of several layers of leather washers, the puck 32 being on the shaft 54 of a split single phase motor 35. The angle of bevel of the pulley 31 and puck 32 is fifteen degrees, this pitch preventing lock-in and bounce, lock-in being caused by too flat an angle, and bounce and lack of driving friction by too great an angle.

In previous equipments, the large motor 35 was permanently connected to the pulley 31, so that as the film was advanced through the projector, the rotor of the motor was rotated by the pull of the film. Thus, the film tension between the sprocket 13 and the roll of film on the reel 12 was determined by friction and the inertia of the motor armature and other rotating elements. In the present invention, the motor is disconnected from the supply reel, thus a spring loaded pin 37 is mounted in the bracket 38. This pin, being under tension of the spring 40, supplies a holdback drag on the film reel, so that the film does not unwind in jerks.

Referring now to Fig. 3, the rewind motor 35 is shown with its stator coils 50 and its rotor 52 mounted on the shaft 53. The shaft portion 53 is of a larger diameter than the bearing portions 54, and, as shown in Fig. 3, the shoulder 41 between the two shaft portions abuts the end bell 42 of the motor, while the shoulder 44 is spaced from the inner surface of the end bell 45. Thus, the shaft 53—54 and rotor 52 are movable axially the distance of the space shown between the shoulder 44 and end bell 45. This amount of movement is sufficient for the puck 32 to make contact with the pulley 31 when the rotor is moved to the left, and to break contact when the rotor is in the position shown in the drawing.

There is also generally shown at 46 a standard centrifugal butterfly assembly, which urges the rotor to the right when the motor is de-energized. This assembly also breaks a contact 47, one section of which is mounted on the collar 48 by a bracket 49. The contact 47 is the starting coil switch for the motor 35.

It is noted from the position of stator plate 51 that the rotor 52, when in its rest position, is not centered with respect to the stator coils. However, upon energization, the rotor will be pulled to the magnetic center of the coils 50, which moves the puck 32 to the left to make contact with the pulley 31. After the motor is de-energized, the rotor is returned to the position shown in the drawing, and the puck 32 is disconnected from the driven pulley 31. Thus, during the reproducing operation, in which the film 8 is in the position shown in solid lines in Fig. 1, the rotor of the motor 35 is disconnected from the supply reel, and the only holdback friction is the spring loaded pin 37. However, when it is desired to rewind the film, it is threaded as shown by the dotted line 8, and the motor 35 is energized, which connects it to the pulley for a rapid rewind of the film.

During the rewinding operation, a mercury switch 61 in an arm 62 pivoted at 63 and having a roller 64 is held in the position shown by the dotted lines in Fig. 1. The energizing circuit of the motor passes through the mercury switch, and, after the end of the film has passed the roller 64, the arm 62 takes the position shown in the solid lines, and the motor 35 is de-energized.

Fig. 4 shows the permanent field winding 50 and the starting field winding 55, the latter being connected through a switch 47. When the rotor 52 accelerates to approximately one-half full speed, the centrifugal mechanism operates and forces the contacts at 47 to open, thus removing the voltage on starting winding 55. When switch 61 is opened, the rotor 52 coasts to a stop and the centrifugal mechanism collapses, allowing spring pressure to close switch 47 and also move rotor 52 to the right. This type of motor control is described in McGraw-Hill Standard Handbook for Electrical Engineers, 1949, Eighth Edition, page 742, paragraph 253.

The above rewind system, therefore, permits an operator to quickly rewind the film either partially or completely in a very short time, since not only is the film rewound at a faster rate by the large motor 35, but fewer manipulations by the operator are required. This is particularly important where one operator is attending several reproducers during the rerecording operation.

I claim:

1. A film rewind mechanism comprising means for advancing a film at a comparatively low and substantially uniform velocity, a reel for supplying said film, a take-up reel for said film, power means for driving said take-up reel, a comparatively large motor for driving said supply reel to rewind said film thereon at a comparatively high speed, said motor being disconnected from said supply reel as said film is advanced from said supply reel to said take-up reel, and means for automatically connecting said comparatively large motor to said supply reel when said motor is energized to rewind said film on said supply reel at said comparatively high speed.

2. A film rewind mechanism in accordance with claim 1, in which said last mentioned means includes a pulley for said supply reel, said pulley having a rim with a taper of approximately fifteen degrees, a puck on the rotor shaft of said motor adapted to be held in driving contact with said pulley by the energy applied to said motor, said puck having the same taper as said pulley, and bias means to move said puck out of contact with said pulley when said motor is de-energized.

3. A rewind mechanism for film comprising a supply reel for supplying film at one speed and for rewinding film thereon at a higher speed, a take-up reel, means for driving said take-up reel at a comparatively low speed when said supply reel is supplying film, a shaft for said supply reel, a pulley on said shaft, a comparatively large motor for rewinding said film at a comparatively high speed, a rotor for said last mentioned motor, a shaft for said rotor, said rotor and said shaft therefor being movable axially a predetermined distance, a puck on said rotor shaft, said puck contacting said pulley when said rotor and said rotor shaft are in one position, said puck being separated from said pulley when said rotor and said rotor shaft are in another position, energization of said motor positioning said motor and said rotor shaft in said first mentioned position, and means for moving said rotor and said rotor shaft to said second mentioned position when said motor is de-energized.

4. A rewind mechanism in accordance with claim 3, in which a movable switch is provided for said motor, said switch being held closed by film passing from said take-up reel to said supply reel, said switch being opened when said film is removed from said switch.

5. A rewind mechanism in accordance with claim 3, in which said pulley has a pitch of substantially fifteen degrees on the contact rim thereof and said puck has a like pitch on its surface adapted to contact said pulley rim.

BYRON F. RYAN.

References Cited in the file of this patent

UNITED STATES PATENTS

| Number | Name | Date |
|---|---|---|
| 773,985 | Ries | Nov. 1, 1904 |
| 1,144,673 | Wheeler | June 29, 1915 |
| 1,920,967 | Carpenter | Aug. 8, 1933 |
| 2,212,617 | Otto | Aug. 27, 1940 |
| 2,468,453 | Mallentjer | Apr. 26, 1949 |